US012798567B2

(12) United States Patent
Jang

(10) Patent No.: US 12,798,567 B2
(45) Date of Patent: Nov. 17, 2026

(54) APPARATUS FOR DRIVING ASSISTANCE, VEHICLE, AND METHOD FOR DRIVING ASSISTANCE

(71) Applicant: HL Klemove Corp., Incheon (KR)

(72) Inventor: Jihoon Jang, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 240 days.

(21) Appl. No.: 18/237,038

(22) Filed: Aug. 23, 2023

(65) Prior Publication Data

US 2024/0208494 A1 Jun. 27, 2024

(30) Foreign Application Priority Data

Dec. 23, 2022 (KR) ........................ 10-2022-0183463

(51) Int. Cl.
*B60W 30/095* (2012.01)
*B60W 10/18* (2012.01)

(52) U.S. Cl.
CPC ........ *B60W 30/0956* (2013.01); *B60W 10/18* (2013.01); *B60W 2420/403* (2013.01); *B60W 2420/408* (2024.01)

(58) Field of Classification Search
CPC ............. B60W 30/0956; B60W 10/18; B60W 2420/403; B60W 2420/408; B60W 2050/143; B60W 30/09; B60W 40/04; B60W 2554/804; B60W 2710/18; B60T 2201/022; B60T 7/22; B60T 8/17558; B60T 8/172; B60T 8/171; G01S 2013/93185; G01S 13/931; G01S 17/931; B60Q 1/535; B60Q 11/00; B60Y 2300/09
See application file for complete search history.

(56) References Cited

U.S. PATENT DOCUMENTS 8,788,176 B1 * 7/2014 Yopp .................. B60W 30/162 701/96
2017/0330464 A1 * 11/2017 Yoo .......................... B60T 7/22

FOREIGN PATENT DOCUMENTS

| | | | | |
|---|---|---|---|---|
| CN | 110356377 A | * 10/2019 | ............ B60W 30/09 |
| JP | 2016203883 A | * 12/2016 | |
| JP | 6469513 B2 | 2/2019 | |
| KR | 10-1829006 B1 | 2/2018 | |

OTHER PUBLICATIONS

JP_2016203883_English (Year: 2025).*
CN_110356377 English (Year: 2025).*
JP_2016203883 Translation for citations (Year: 2025).*
CN_110356377 with translation (Year: 2025).*
JP_2016203883 with translation (Year: 2025).*

* cited by examiner

*Primary Examiner* — Ramon A. Mercado
*Assistant Examiner* — Paul A Castro
(74) *Attorney, Agent, or Firm* — Hauptman Ham, LLP

(57) ABSTRACT

Disclosed herein is a driving assistance system. The driving assistance system includes a sensor including at least one of a camera, a radar, or a light detection and ranging (LiDAR), which has a field of sensing outside a vehicle, and a processor configured to process output data of the sensor. The processor acquires information on nearby objects of the vehicle based on the output data of the sensor, calculates a time to collision (TTC) based on the information on the nearby objects, compares the TTC with a reference value, and determines whether a warning is output or automatic braking is performed based on the comparison, and the reference value is based on a state of a brake lamp of the vehicle.

14 Claims, 11 Drawing Sheets

FIRST TABLE
(WHEN BRAKE LAMP IS NORMAL)

| VELOCITY OF HOST VEHICLE | SENSITIVITY | WARNING TTC |
|---|---|---|
| a1 | b1 | c1 |
| a2 | b2 | c2 |

⋮

SECOND TABLE
(WHEN BRAKE LAMP IS OUT OF ORDER)

| VELOCITY OF HOST VEHICLE | SENSITIVITY | WARNING TTC |
|---|---|---|
| a1 | b1 | c'1 |
| a2 | b2 | c'2 |

⋮

FIRST TABLE
(WHEN BRAKE LAMP IS NORMAL)

| VELOCITY OF HOST VEHICLE | SENSITIVITY | WARNING TTC | BRAKING TTC |
|---|---|---|---|
| a1 | b1 | c1 | d1 |
| a2 | b2 | c2 | d2 |

• • •

SECOND TABLE
(WHEN BRAKE LAMP IS OUT OF ORDER)

| VELOCITY OF HOST VEHICLE | SENSITIVITY | WARNING TTC | BRAKING TTC |
|---|---|---|---|
| a1 | b1 | c'1 | d'1 |
| a2 | b2 | c'2 | d'2 |

• • •

APPARATUS FOR DRIVING ASSISTANCE, VEHICLE, AND METHOD FOR DRIVING ASSISTANCE

CROSS-REFERENCE TO RELATED APPLICATION

This application claims the benefit of Korean Patent Application No. 10-2022-0183463, filed on Dec. 23, 2022 in the Korean Intellectual Property Office, the disclosure of which is incorporated herein by reference.

BACKGROUND

1. Field

Embodiments of the present disclosure relate to an apparatus for driving assistance capable of automatically performing braking of a vehicle in an emergency situation, a vehicle including the same, and a method for driving assistance method.

2. Description of the Related Art

Vehicles are the most common transportation in modern society, and the number of people using the vehicles is increasing. Although there are advantages such as easy long-distance traveling and convenience of living with the development of a vehicle technology, a problem that road traffic conditions are worse and traffic congestion becomes serious in densely populated places such as Korea often occurs.

Recently, research on vehicles equipped with an advanced driver assistance system (ADAS) for actively providing information on a vehicle state, a driver state, and/or a nearby environment in order to reduce a driver's burden and enhance convenience is actively progressing.

For example, an ADAS mounted on vehicles may perform functions of lane departure warning (LDW), lane keeping assist (LKA), high beam assist (HBA), autonomous emergency braking (AEB), traffic sign recognition (TSR), adaptive cruise control (ACC), blind spot detection (BSD), etc.

SUMMARY

Therefore, it is an aspect of the present disclosure to provide a driving assistance system, a vehicle including the same, and a driving assistance method for providing an additional preparation time to a driver of a following vehicle when a brake lamp is out of order by differently applying reference values used for determining a warning output or automatic braking according to a state of the brake lamp of the vehicle.

Additional aspects of the disclosure will be set forth in part in the description which follows and, in part, will be obvious from the description, or may be learned by practice of the disclosure.

In accordance with one aspect of the present disclosure, an apparatus for driving assistance includes a sensor including at least one of a camera, a radar, or a light detection and ranging (LiDAR), which has a field of sensing outside a vehicle, and a processor configured to process output data of the sensor. The processor acquires information on nearby objects of the vehicle based on the output data of the sensor, calculates a time to collision (TTC) based on the information on the nearby objects, compares the TTC with a reference value, and determines whether a warning is output or automatic braking is performed based on the comparison. The reference value is based on a state of a brake lamp of the vehicle.

The processor may determine that the warning is output or the automatic braking is performed when the TTC is smaller than the reference value.

The processor may compare the TTC with a first reference value when the state of the brake lamp is normal, and compare the TTC with a second reference value greater than the first reference value when the state of the brake lamp is abnormal.

The processor may determine that a required deceleration for the automatic braking is a first deceleration when the state of the brake lamp is normal, and determine that the required deceleration for the automatic braking is a second deceleration being a smaller than the first deceleration when the state of the brake lamp is abnormal.

A braking distance of the vehicle when the state of the brake lamp is abnormal may be longer than a braking distance of the vehicle when the state of the brake lamp is normal.

The processor may include a memory configured to store a memory configured to store a first table and a second table. The first table includes first reference values according to a velocity of the vehicle or a relative velocity between the vehicle and the nearby object. The second table includes second reference values according to the velocity of the vehicle or the relative velocity.

The processor may transmit a control signal to a braking device to brake the vehicle according to the first deceleration when the state of the brake lamp is normal, and transmit the control signal to the braking device to brake the vehicle according to the second deceleration when the state of the brake lamp is abnormal.

In accordance with another aspect of the present disclosure, a vehicle includes a braking device configured to brake the vehicle, a brake lamp turned on upon braking of the vehicle and provided at a rear of the vehicle, a sensor including at least one of a camera, a radar, or a light detection and ranging (LiDAR), which has a field of sensing outside the vehicle, and a processor configured to process output data of the sensor. The processor acquires information on nearby objects of the vehicle based on the output data of the sensor, calculates a time to collision (TTC) based on the information on the nearby objects, compares the TTC with a reference value that varies depending on a state of the brake lamp, and determines whether a warning is output or automatic braking is performed based on the comparison. The reference value is based on a state of a brake lamp of the vehicle.

In accordance with still another aspect of the present disclosure, a method for driving assistance includes acquiring information on nearby objects of a vehicle, calculating a time to collision (TTC) based on the information on the nearby objects, comparing the TTC with a reference value, and determining whether a warning is output or automatic braking is performed based on the comparison. The reference value is based on a state of a brake lamp of the vehicle.

The determining of whether the warning is output or the automatic braking is performed may include determining that the warning is output or the automatic braking is performed when the TTC is smaller than the reference value.

The comparing of the TTC with the reference value may include comparing the TTC with a first reference value when the state of the brake lamp is normal, and comparing the TTC with a second reference value greater than the first reference value when the state of the brake lamp is abnormal.

The method may further include determining that a required deceleration for the automatic braking is a first deceleration when the state of the brake lamp is normal, and determining that the required deceleration for the automatic braking is a second deceleration being a smaller than the first deceleration when the state of the brake lamp is abnormal.

The method may further include storing a first table and a second table. The first table includes first reference values according to a velocity of the vehicle or a relative velocity between the vehicle and the nearby object. The second table includes second reference values according to the velocity of the vehicle or the relative velocity.

The driving assistance method may further include transmitting a control signal to the braking device to brake the vehicle according to the first deceleration when the state of the brake lamp is normal, and transmitting the control signal to the braking device to brake the vehicle according to the second deceleration when the state of the brake lamp is abnormal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
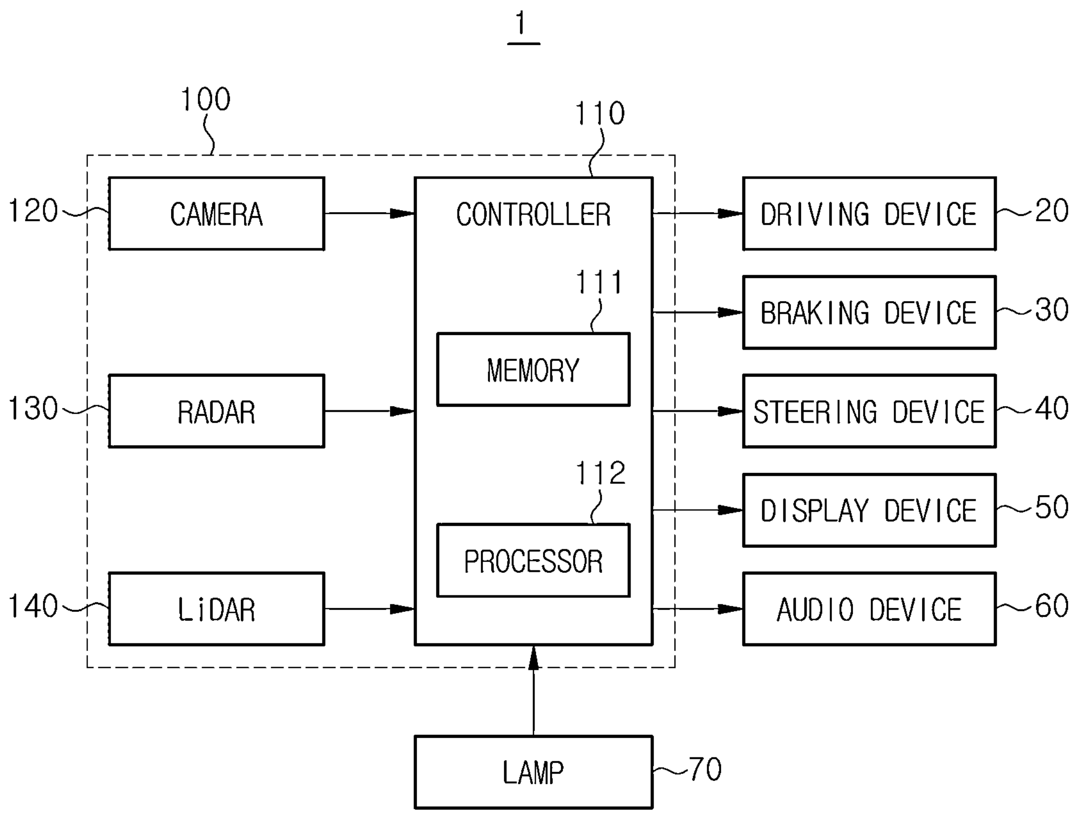
FIG. 1 is a block diagram illustrating operations of a vehicle and a driving assistance system included therein according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
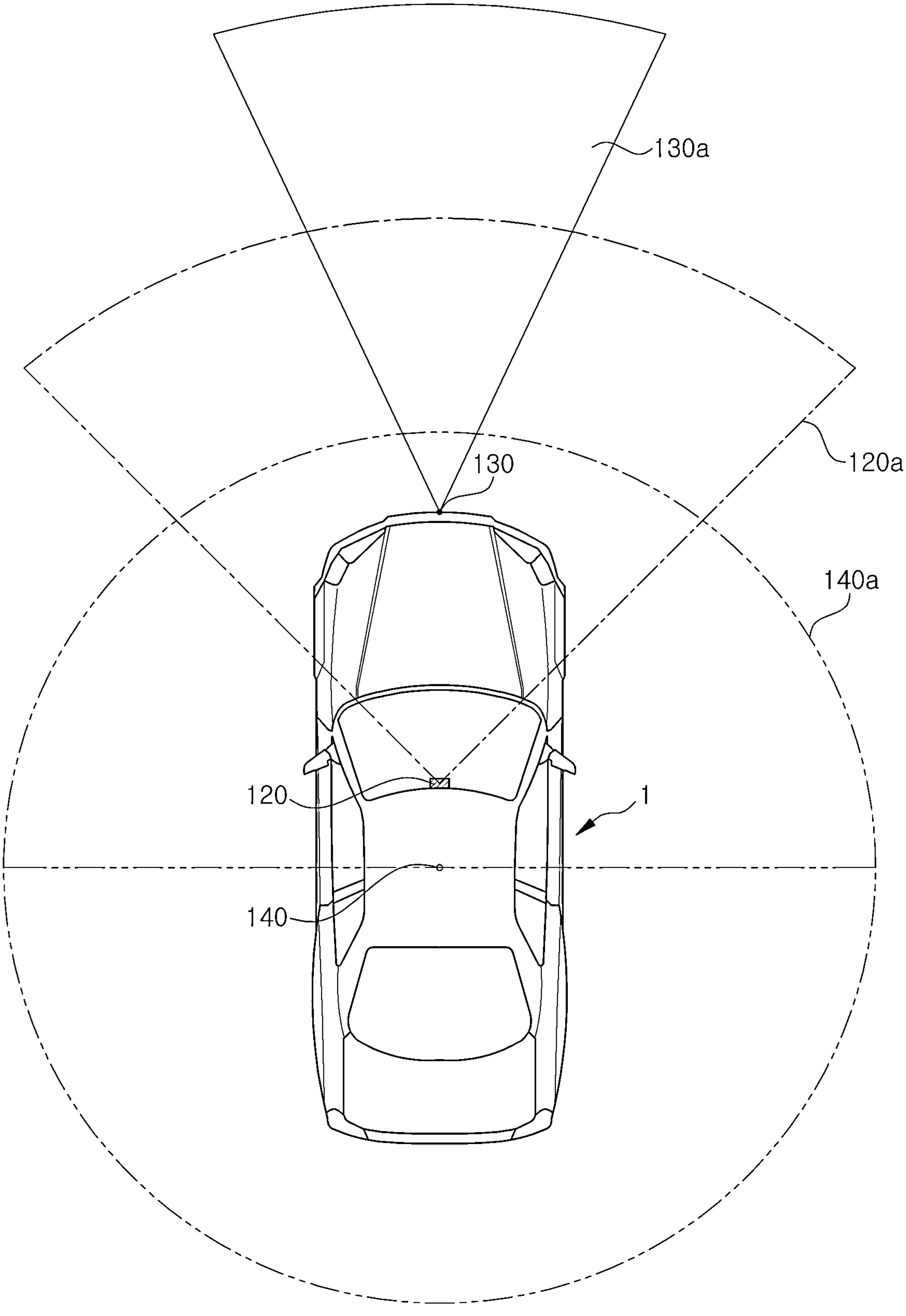
FIG. 2 is a view illustrating fields of view of a camera, a radar, and a light detection and ranging (LIDAR) included in the vehicle according to one embodiment.

FIG. 1 is a block diagram illustrating operations of a vehicle and a driving assistance system included therein according to one embodiment, and FIG. 2 is a view illustrating fields of view of a camera, a radar, and a light detection and ranging (LIDAR) included in the vehicle according to one embodiment.

As illustrated in FIG. 1, a vehicle 1 may include a driving device 20, a braking device 30, a steering device 40, a display device 50, an audio device 60, a lamp 70, and a driving assistance system 100.

In addition, although not illustrated in the drawings, the vehicle 1 may further include a behavior sensor for detecting a dynamic of the vehicle 1. For example, the behavior sensor may include at least one of a vehicle velocity sensor for detecting a longitudinal velocity of the vehicle 1, an acceleration sensor for detecting a longitudinal acceleration and a transverse acceleration of the vehicle 1, or a gyro sensor for detecting a yaw rate, a roll rate, and a pitch rate of the vehicle 1.

In addition, the vehicle 1 may further include a navigation device. The navigation device may generate a route to a destination input by a driver and provide the generated route to the driver. The navigation device may receive a Global Navigation Satellite System (GNSS) signal from a GNSS and identify an absolute position (coordinates) of the vehicle 1 based on the GNSS signal. The navigation device may generate the route to the destination based on a position (coordinates) of the destination input by the driver and a current position (coordinates) of the vehicle 1.

The above-described components may transmit or receive data via a vehicle communication network. For example, the above-described components included in the vehicle 1 may transmit or receive data via the vehicle communication network such as Ethernet, media oriented systems transport (MOST), Flexray, a controller area network (CAN), or a local interconnect network (LIN).

The driving device 20 generates power required for moving the vehicle 1. The driving device 20 may include, for example, an engine, an engine management system (EMS), a transmission, and a transmission control unit (TCU).

The engine may generate power for the vehicle 1 to travel, and the EMS may control the engine in response to a driver's acceleration intention transmitted through an accelerator pedal or a request of the driving assistance system 100. The transmission may transmit the power generated by the engine to wheels for deceleration, and the TCU may control the transmission in response to a driver's transmission instruction transmitted through a transmission lever and/or a request of the driving assistance system 100.

Alternatively, the driving device 20 may include a driving motor, a reducer, a battery, a power control device, etc. In this case, the vehicle 1 may be implemented as an electric vehicle.

Alternatively, the driving device 20 may include both engine-related devices and driving motor-related devices. In this case, the vehicle 1 may be implemented as a hybrid electric vehicle.

The braking device 30 may decelerate the vehicle 1. For example, the braking device 30 may include a brake caliper and an electronic brake control module (EBCM). The brake caliper may decelerate the vehicle 1 or stop the vehicle 1 using friction with a brake disk.

The EBCM may control the brake caliper in response to a driver's braking intention transmitted through a brake pedal or a request of the driving assistance system 100. For example, the EBCM may receive a deceleration request including a deceleration from the driving assistance system 100 and electrically or hydraulically control the brake caliper so that the vehicle 1 decelerates based on the requested deceleration.

The steering device 40 may include an electronic power steering control module (EPS). The steering device 40 may change a traveling direction of the vehicle 1, and the EPS may assist with an operation of the steering device 40 so that the driver may easily manipulate a steering wheel in response to a driver's steering intention transmitted through a steering wheel.

In addition, the EPS may control the steering device 40 in response to a request of the driving assistance system 100. For example, the EPS may receive a steering request including a steering torque from the driving assistance system 100 and control the steering device 40 to steer the vehicle 1 based on the requested steering torque.

The display device 50 may include a cluster, a head-up display, a center fascia monitor, and the like and provide various pieces of information and entertainments to the driver through images. For example, the display device 50 may provide traveling information of the vehicle 1, a warning message, etc., to the driver.

The audio device 60 may include a plurality of speakers and provide various pieces of information and entertainments to the driver through sounds. For example, the audio device 60 may provide traveling information of the vehicle 1, a warning message, etc., to the driver.

The lamp 70 may include a plurality of lamps provided at an outer side of the vehicle 1, and each of the plurality of lamps may perform a different function depending on each provided position. For example, front lamps provided at a front of the vehicle 1 may be used to secure the driver's vision, and rear lamps provided at the rear of the vehicle 1 may inform a driver of a following vehicle of information on a dynamic or moving route of the vehicle 1.

The driving assistance system 100 according to one embodiment may communicate with the driving device 20, the braking device 30, the steering device 40, the display device 50, and the audio device 60 via the vehicle communication network. The driving assistance system 100 may use data received from other components of the vehicle 1 as a basis for recognition and determination and transmit control signals for controlling the vehicle 1 to the other components of the vehicle 1 based on the recognition and determination results.

The driving assistance system 100 may provide various functions for safety to the driver and furthermore, may also be used for autonomous driving of the vehicle 1. For example, the driving assistance system may provide functions of lane departure warning (LDW), lane keeping assist (LKA), high beam assist (HBA), autonomous emergency braking (AEB), traffic sign recognition (TSR), adaptive cruise control (ACC), blind spot detection (BSD), etc.

The driving assistance system 100 may include a controller 110, a camera 120, a radar 130, and a LIDAR 140 in order to perform the above-described functions.

The controller 110, the camera 120, the radar 130, and the LiDAR 140 may be provided to be physically separated from one another. For example, the controller 110 may be installed in a housing separated from a housing of the camera 120, a housing of the radar 130, and a housing of the LiDAR 140. The controller 110 may transmit or receive data with the camera 120, the radar 130, or the LiDAR 140 through a wide-bandwidth network.

Alternatively, at least some of the camera 120, the radar 130, the LiDAR 140, and the controller 110 may also be integrally provided. For example, the camera 120 and the controller 110 may be provided in the same housing, the radar 130 and the controller 110 may be provided in the same housing, or the LiDAR 140 and the controller 110 may be provided in the same housing.

The camera 120 may capture surroundings of the vehicle 1 and acquire image data of the surroundings of the vehicle 1. For example, as illustrated in FIG. 2, the camera 120 may be installed on a front windshield of the vehicle 1 and may have a forward field of view 120*a* of the vehicle 1.

The camera 120 may include a plurality of lenses and an image sensor. The image sensor may include a plurality of photodiodes for converting light into electrical signals, and the plurality of photodiodes may be disposed in the form of a two-dimensional matrix.

The image data may include information on another vehicle, a pedestrian, a cyclist, or a lane line (marker for distinguishing a lane) positioned near the vehicle 1.

The driving assistance system 100 may include a processor for processing the image data of the camera 120, and the processor may be, for example, a component included in the camera 120 or may be a component included in the controller 110.

The processor may acquire image data from an image sensor of the camera 120 and detect and identify nearby objects of the vehicle 1 based on processing the image data. For example, the processor may generate tracks corresponding to the nearby objects of the vehicle 1 using image processing and classify the generated tracks. The processor may identify whether the track is another vehicle, a pedestrian, or a cyclist, etc., and assign an identification code to the track.

The processor may transmit data (or positions and classifications of the tracks) on tracks (hereinafter referred to as "camera track") near the vehicle 1 to the controller 110. The controller 110 may perform a driver assistance function or driving assistance function based on the camera track.

The radar 130 may transmit transmission radio waves toward the surroundings of the vehicle 1 and detect the nearby objects of the vehicle 1 based on reflected radio waves reflected from the nearby objects. For example, as illustrated in FIG. 2, the radar 130 may be installed on a grille or a bumper of the vehicle 1 and may have a forward field of sensing 130*a* of the vehicle 1.

The radar 130 may include a transmission antenna (or a transmission antenna array) for radiating transmission radio waves toward the surroundings of the vehicle 1 and a reception antenna (or a reception antenna array) for receiving reflection signals, that is, reflected radio waves that return after being reflected from objects.

The radar 130 may acquire radar data from the transmission radio waves transmitted by the transmission antenna and the reflected radio waves received by the reception antenna. The radar data may include position information (e.g., distance information) or velocity information of front objects of the vehicle 1.

The driving assistance system 100 may include a processor for processing the radar data, and the processor may be, for example, a component included in the radar 130 and may also be a component included in the controller 110.

The processor may acquire the radar data from the reception antenna of the radar 130 and generate tracks corresponding to the objects by clustering reflection points of the reflection signal. The processor may, for example, acquire a distance of the track based on a time difference between a transmission time of the transmission radio wave and a reception time of the reflected radio wave and acquire a relative velocity of the track based on a frequency difference between the transmission radio wave and the reflected radio wave.

The processor may transmit data (or the distances and relative velocities of the tracks) on the tracks (hereinafter referred to as "radar track") near the vehicle 1 acquired from the radar data to the controller 110. The controller 110 may perform a driver assistance function or driving assistance function based on the radar track.

The LiDAR 140 may emit light (e.g., infrared rays) toward the surroundings of the vehicle 1 and detect the nearby objects of the vehicle 1 based on reflection light reflected from the nearby objects. For example, as illustrated in FIG. 2, the LIDAR 140 may be installed on a roof of the vehicle 1 and may have a field of view 140*a* in all directions near the vehicle 1.

The LiDAR 140 may include a light source (e.g., a light emitting diode, a light emitting diode array, a laser diode, or a laser diode array) for emitting light (e.g., infrared rays) and an optical sensor (e.g., a photodiode or a photodiode array) for receiving light (e.g., infrared rays). In addition, as necessary, the LiDAR 140 may further include a driving device for rotating the light source or the optical sensor.

While the light source or the optical sensor rotates, the LiDAR 140 may emit light through the light source and receive the light reflected from objects through the optical sensor, thereby acquiring LiDAR data.

The LiDAR data may include relative positions (distances or directions of nearby objects) or relative velocities of the nearby objects of the vehicle 1.

The driving assistance system 100 may include a processor for processing the LiDAR data, and the processor may be, for example, a component included in the LiDAR 140 and may also be a component included in the controller 110.

The processor may generate tracks corresponding to objects by clustering reflection points by the reflected light. The processor may, for example, acquire a distance to the object based on a time difference between a light transmission time and a light reception time. In addition, the processor may acquire a direction (or an angle) of the object with respect to a traveling direction of the vehicle 1 based on a direction in which the light source emits light when the optical sensor receives the reflected light.

The processor may transmit data (or the distances and relative velocities of the tracks) on the tracks (hereinafter referred to as "LiDAR track") near the vehicle 1 acquired from the LiDAR data to the controller 110.

The controller 110 may be implemented as at least one of an electronic control unit (ECU) or a domain control unit (DCU) electrically connected to the camera 120, the radar 130, or the LiDAR 140.

The controller 110 may process the camera track (or the image data) of the camera 120, the radar track (or the radar data) of the radar 130, or the LiDAR track (or the LiDAR data) of the LiDAR 140 and provide control signals to the driving device 20, the braking device 30, or the steering device 40.

The controller 110 may include at least one memory 111 in which a program for performing an operation to be described below is stored and at least one processor 112 for executing the stored program.

The memory 111 may store a program or data for processing the image data, the radar data, or the LiDAR data. In addition, the memory 111 may store programs or data for generating driving, braking, and steering signals.

The memory 111 may temporarily store the image data received from the camera 120, the radar data received from the radar 130, or the LiDAR data received from the LiDAR 140 and temporarily store processing the image data, the radar data, or the LiDAR data of the processor 112.

In addition, the memory 111 may include a high definition (HD) map. Unlike general maps, the HD map may include detailed information on surfaces of roads or intersections, such as lane lines, traffic lights, intersections, and traffic signs. In particular, landmarks (e.g., a lane line, a traffic light, an intersection, and a traffic sign) that vehicles encounters while traveling are implemented in the form of a three dimension on the HD map.

The memory 111 may include not only volatile memories such as a static random access memory (SRAM) and a dynamic RAM (DRAM) but also non-volatile memories such as a flash memory, a read only memory (ROM), and an erasable programmable ROM (EPROM).

The processor 112 may process the camera track of the camera 120, the radar track of the radar 130, or the LiDAR track of the LiDAR 140. For example, the processor 112 may fuse the camera track, the radar track, or the LiDAR track and output fusion track.

Based on processing the fusion data, the processor 112 may generate a driving signal, a braking signal, or a steering signal for respectively controlling the driving device 20, the braking device 30, or the steering device 40. For example, the processor 112 may evaluate risk of collision between the fusion tracks and the vehicle 1. The processor 112 may control the driving device 20, the braking device 30, or the steering device 40 to steer or brake the vehicle 1 based on the risk of collision between the fusion tracks and the vehicle 1.

The processor 112 may include the image processor for processing the image data of the camera 120, the signal processor for processing the radar data of the radar 130 or the LiDAR data of the LiDAR 140, or a micro control unit (MCU) for generating the driving, braking, and steering signals.

As described above, the controller 110 may provide the driving signal, the braking signal, or the steering signal based on the image data of the camera 120, the radar data of the radar 130, or the LiDAR data of the LiDAR 140.

A detailed operation of the driving assistance system 100 will be described below in more detail.

In addition, although not illustrated in the drawings, a vehicle according to one embodiment may further include a communication module capable of communicating with other external devices. The communication module may wirelessly communicate with a base station or an access point (AP) and transmit or receive data with external devices via the base station or the AP.

For example, the communication module may wirelessly communicates with the AP using WiFi (WiFi™, IEEE 802.11 technical standard) or communicate with the base station using code division multiple access (CDMA), wideband CDMA (WCDMA), Global System for Mobiles (GSM), Long Term Evolution (LTE), fifth generation (5G), wireless broadband Internet (WiBro), etc.

In addition, the communication module may directly communicate with the external devices. For example, the communication module may transmit or receive data with external devices within a short range using WiFi Direct, Bluetooth (Bluetooth™, IEEE 802.15.1 technical standard), ZigBee (ZigBee™, IEEE 802.15.4 technical standard), etc.

Meanwhile, all of the components illustrated in FIG. 1 are not necessarily included in the vehicle 1. For example, at least one of the camera 120, the radar 130, or the LiDAR 140 may be omitted.

In addition, although the camera 120, the radar 130, and the LiDAR 140 are illustrated in the drawings as one component of the driving assistance system 100, it is not always necessary that these components be physically included in the driving assistance system 100.

Therefore, at least one of the camera 120, the radar 130, or the LiDAR 140 may be provided in the vehicle 1 as a component independent of the driving assistance system 100, and it is possible to acquire the image data or the camera track, the radar data or the radar track, or the LiDAR data or the LiDAR track from the at least one of the camera 120, the radar 130, or the LiDAR 140 provided in the vehicle 1.

Figure 3:
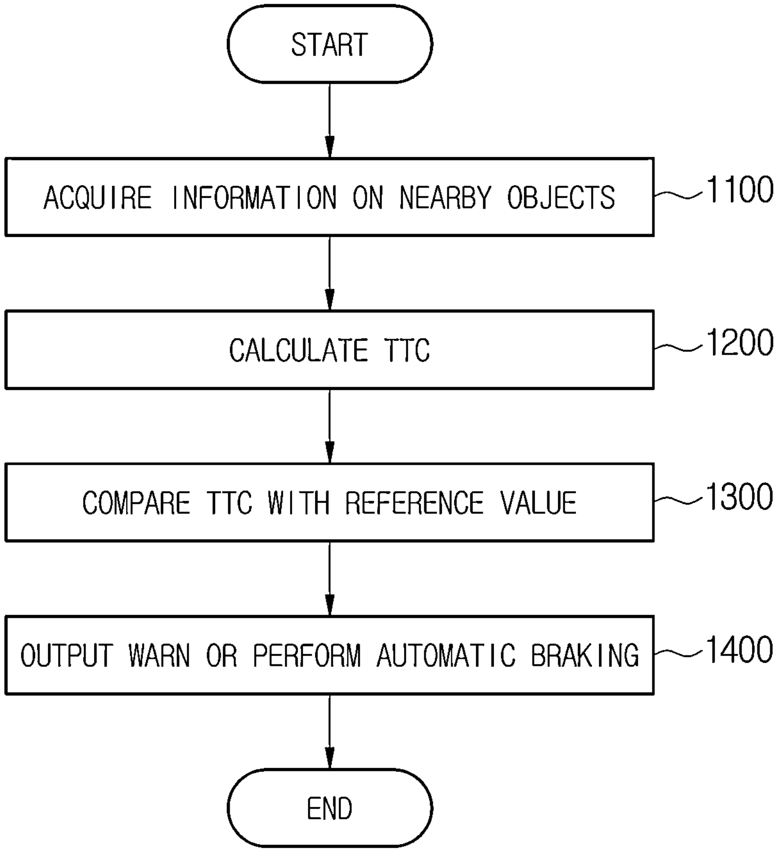
FIG. 3 is a flowchart illustrating a driving assistance method according to one embodiment.
Figure 4:
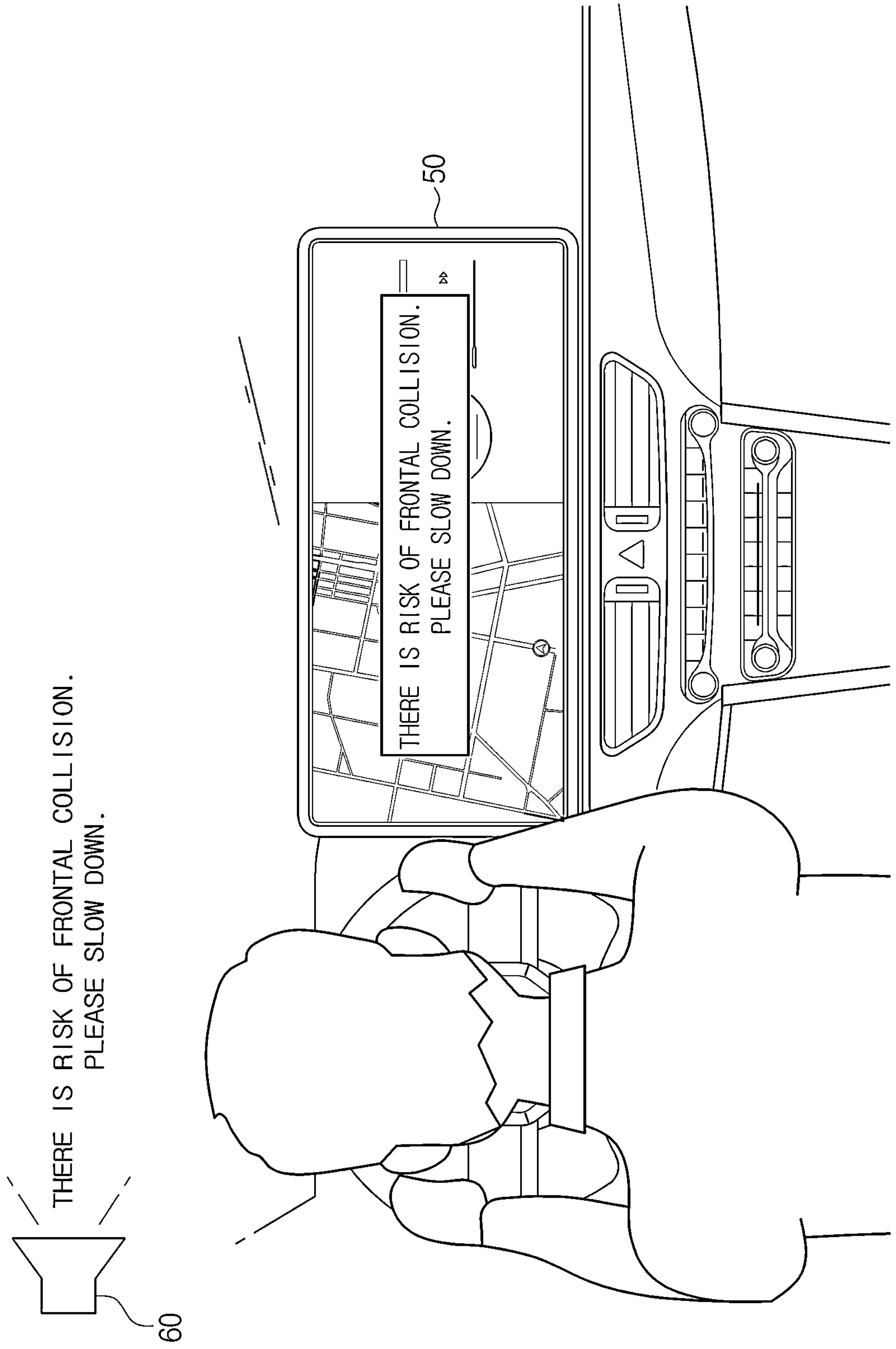
FIG. 4 is a view illustrating an example in which a warning is output according to the driving assistance method according to one embodiment.

FIG. 3 is a flowchart illustrating a driving assistance method according to one embodiment, and FIG. 4 is a view illustrating an example in which a warning is output according to the driving assistance method according to one embodiment.

A driving assistance method according to one embodiment may be performed by the driving assistance system 100 or the vehicle 1 including the same. Therefore, a description of the driving assistance system 100 or the vehicle 1 may also be applied to the embodiment of the driving assistance method in the same manner even when not otherwise mentioned. In addition, a description of the driving assistance method may also be applied to the driving assistance system 100 or the vehicle 1 in the same manner.

Referring to FIG. 3, the controller 110 acquires information on nearby objects (1100).

The information on the nearby objects may be acquired from at least one of the camera 120, the radar 130, or the LiDAR 140. For example, the information on the nearby objects may include at least one of a position of the nearby object, a distance to the vehicle 1, a relative velocity with the vehicle 1, or a type of the nearby object determined based on the image data, the radar data, or the LiDAR data.

The controller 110 calculates a time to collision (TTC) based on the acquired information on the nearby objects (1100).

The TTC may be calculated based on a relative distance and a relative velocity between the vehicle 1 and the object.

The controller 110 may compare the TTC with a reference value (1300) and output a warning or perform automatic braking based on a comparison result (1400). However, when there is no object near the vehicle 1 or there is no risk of collision, it goes without saying that the warning is not output or the automatic braking is not performed.

As the comparison of the TTC and the reference value, when there is risk of collision between the vehicle 1 and the nearby object, a warning may be output to a user as illustrated in FIG. 4. The output warning may include a message indicating that a vehicle needs to slow down because there is the risk of collision with the nearby object.

The controller 110 may visually output the warning through the display device 50 or audibly output the warning through the audio device 60. In the drawings, although both the visual warning output and the audible warning output are illustrated for convenience of description, the warning may also be output using only one of these methods.

In addition, the warning may also be output by a haptic method through a steering wheel or a seat belt.

Meanwhile, in some cases, the automatic braking may be immediately performed without warning output. A description thereof will be given below in detail.

Figure 5:
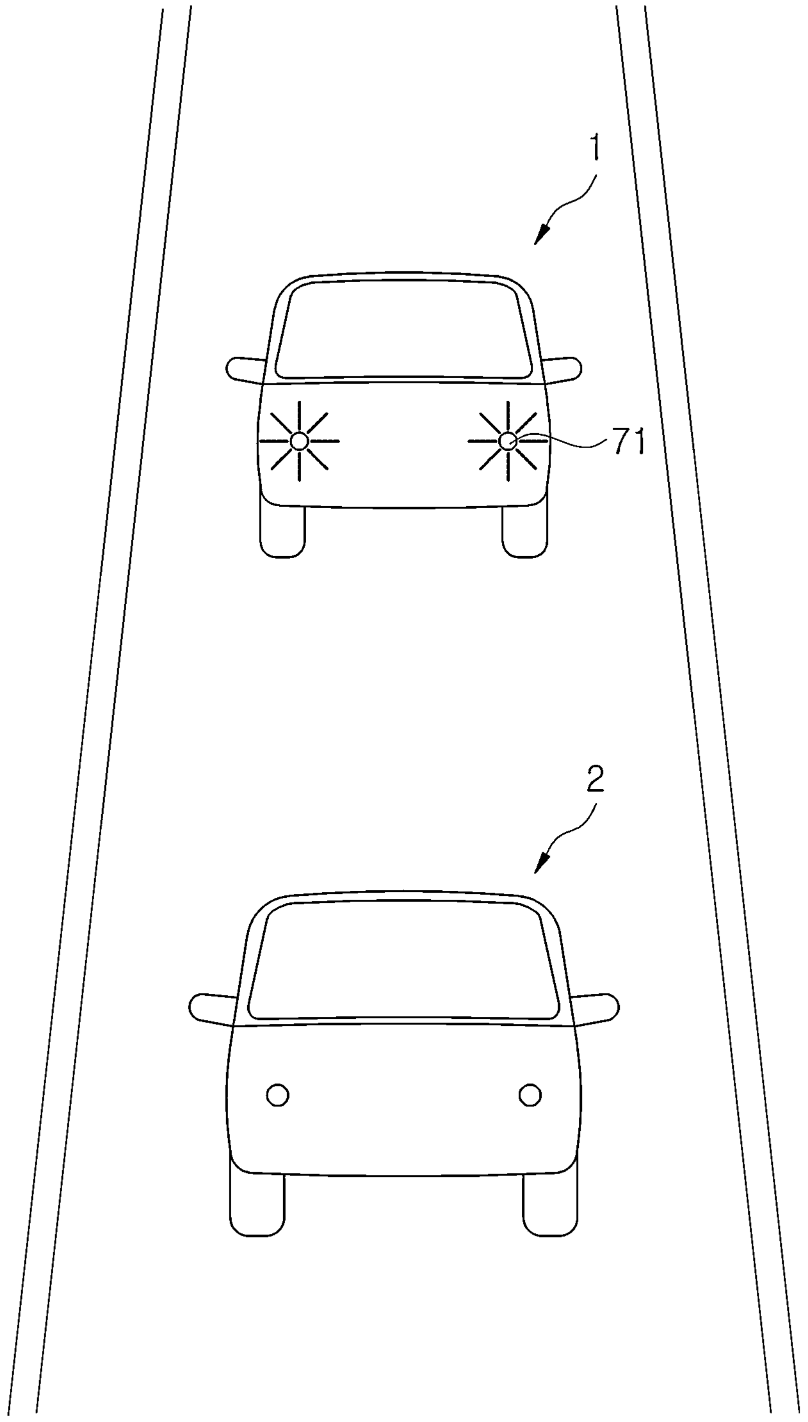
FIG. 5 is a view illustrating a case of braking of a vehicle according to the driving assistance method according to one embodiment.
Figure 6:
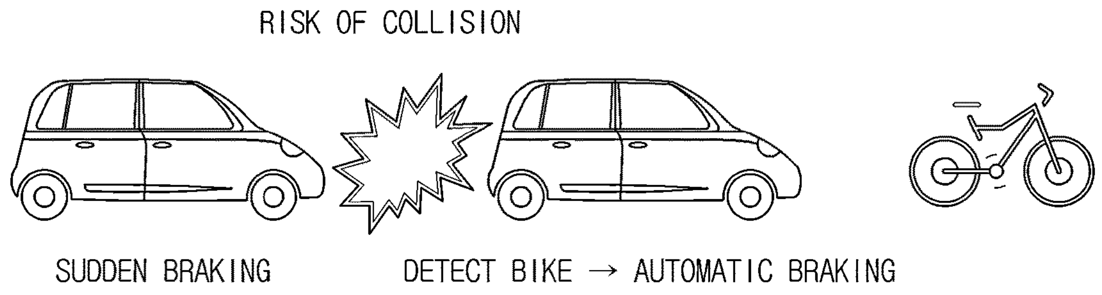
FIG. 6 is a view illustrating a situation that may occur when a brake lamp of a vehicle is out of order.

FIG. 5 is a view illustrating a case of braking of a vehicle according to the driving assistance method according to one embodiment, and FIG. 6 is a view illustrating a situation that may occur when a brake lamp of a vehicle is out of order.

The warning output and the automatic braking are an operation for decelerating the vehicle 1 to avoid the collision with the nearby object except that only the subject of braking is different. When the driver or the controller 110 operates the braking device 30 to brake the vehicle 1, a brake lamp 71 provided at the rear of the vehicle 1 is turned on as illustrated in FIG. 5.

When the brake lamp 71 is turned on, a driver of a following vehicle 2 may check braking of a preceding vehicle 1 and take countermeasures for avoiding the collision with the preceding vehicle 1, such as performing braking for the following vehicle 2 or changing a lane.

However, when the brake lamp 71 is not normally turned on due to a failure, it is difficult for the driver of the following vehicle to check the braking of the vehicle even when the preceding vehicle is braking. Therefore, the driver of the following vehicle may recognize braking of the preceding vehicle only after approaching the preceding vehicle, and the driver may suddenly brake in order to avoid the collision with the preceding vehicle or the vehicle may collide with the preceding vehicle despite sudden braking.

Therefore, the driving assistance system, the vehicle including the same, and the driving assistance method according to one embodiment can provide the additional time for which the following vehicle may cope with the braking of the vehicle by differently applying the reference values used for determining the warning output or the automatic braking according to the state of the brake lamp.

Figure 7:
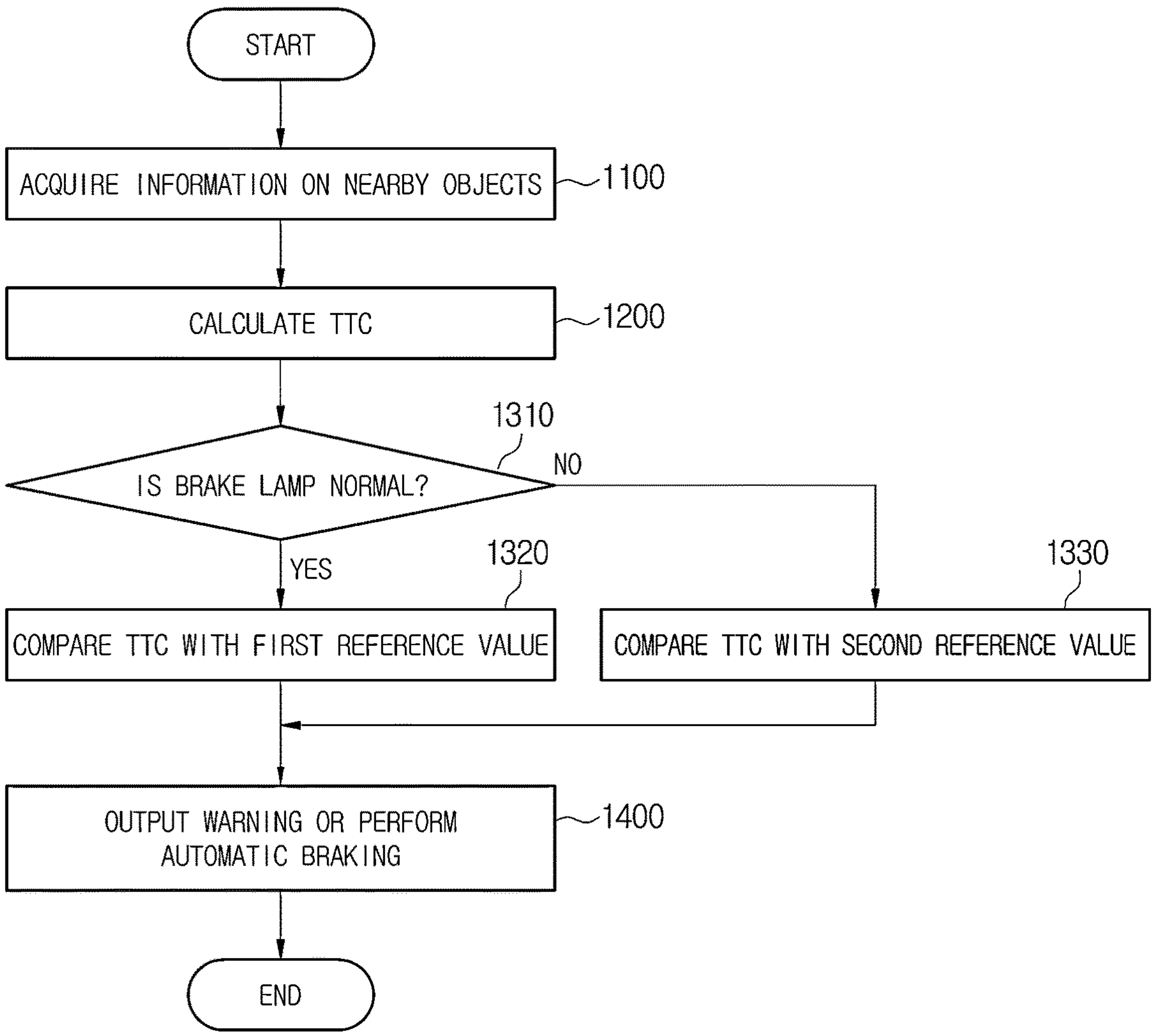
FIG. 7 is a flowchart specifically illustrating the driving assistance method according to one embodiment.

FIG. 7 is a flowchart specifically illustrating the driving assistance method according to one embodiment.

A description of the operations of acquiring information on the nearby object (1100) and calculating the TTC (1200) is the same as the above-described contents.

Here, the operation of comparing the TTC with the reference value (1300) will be described in detail.

As described above, the controller 110 may differently apply the reference values compared with the TTC according to the state of the brake lamp 71. As illustrated in FIG. 7, when the brake lamp is normal (YES in 1310), the TTC is compared with a first reference value (1320), and when the brake lamp is abnormal, that is, when the brake lamp is out of order (NO in 1310), the TTC is compared with a second reference value (1330).

Therefore, when the brake lamp is normal, the warning may be output or the automatic braking may be performed based on comparing the TTC with the first reference value, and when the brake lamp is out of order, the warning may be output or the automatic braking may be performed based on comparing the TTC with the second reference time (1400).

Figure 8:
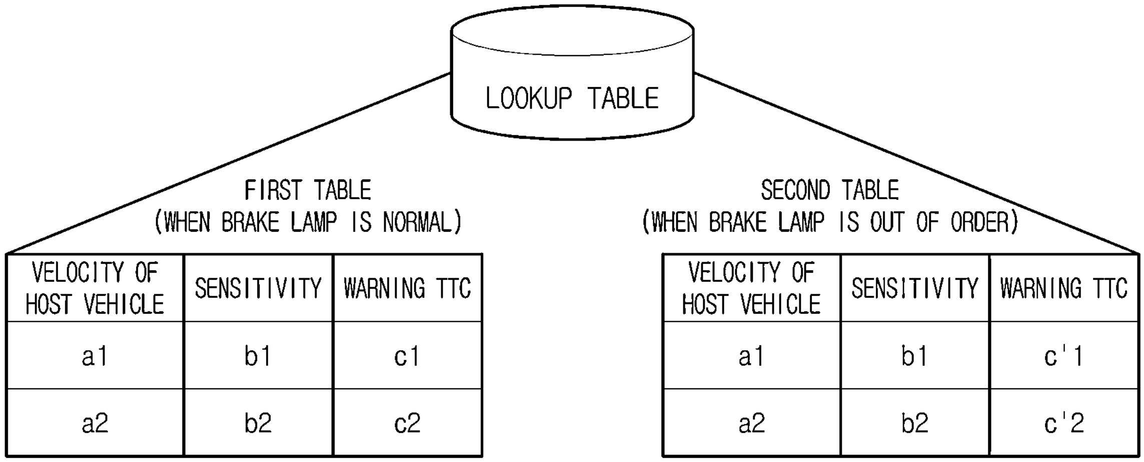
FIG. 8 is a view illustrating reference values used in the driving assistance method according to one embodiment.

FIG. 8 is a view illustrating reference values used in the driving assistance method according to one embodiment.

For example, the memory 111 may store the reference values compared with the TTC in the form of a lookup table. As described above, in order to apply different reference values when the brake lamp 71 is normal and when the brake lamp 71 is out of order, as illustrated in FIG. 8, each of a first table used when the brake lamp is normal and a second table used when the brake lamp is out of order may be separately stored.

The reference values for the TTC for each of the measured velocities of a host vehicle and each of set sensitivities may be stored in the first table and the second table. However, the tables illustrated in FIG. 8 are only an example applicable to the embodiment, and reference values for each of other parameters such as relative velocities with nearby objects in addition to the velocity of the host vehicle and the sensitivity.

The tables illustrated in the example of FIG. 8 are tables used to determine whether to output a warning. Here, reference values such as c1 and c2 may be included in the first reference value compared with the TTC when the brake lamp 71 is normal, and reference values such as c'1 and c'2 may be included in the second reference value compared with the TTC when the brake lamp 71 is out of order.

Here, the second reference value used when the brake lamp is out of order may be set greater than the first reference value used when the brake lamp is normal. That is, by outputting the warning or performing the automatic braking when the TTC is relatively longer (than that of a case in which the brake lamp is normal) in a situation in which the brake lamp is out of order, it is possible to provide an additional time so that the following vehicle may cope with the braking of the vehicle 1 in advance.

Meanwhile, the values stored in the first table and the second table may be determined by simulation, experiment, statistics, theory, etc., in a development stage of the vehicle 1. However, the embodiment of the present disclosure is not limited thereto, and each of the first reference value and the second reference value may also be acquired through different rules or trained model without being pre-stored in the form of the table.

Figure 9:
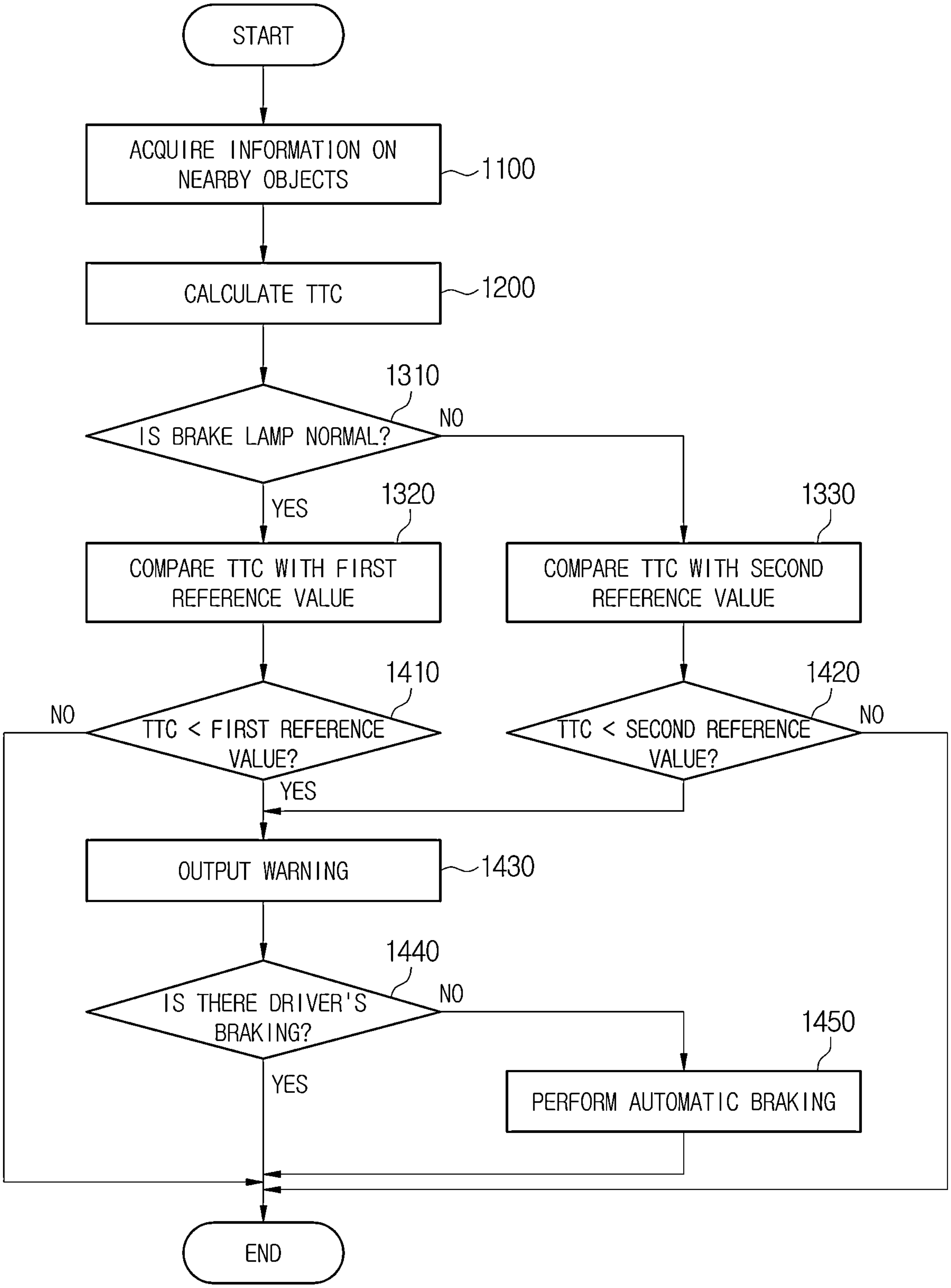
FIG. 9 is a flowchart illustrating an operation performed according to a comparison result between a time to collision (TTC) and a reference value in the driving assistance method according to one embodiment.
Figure 10:
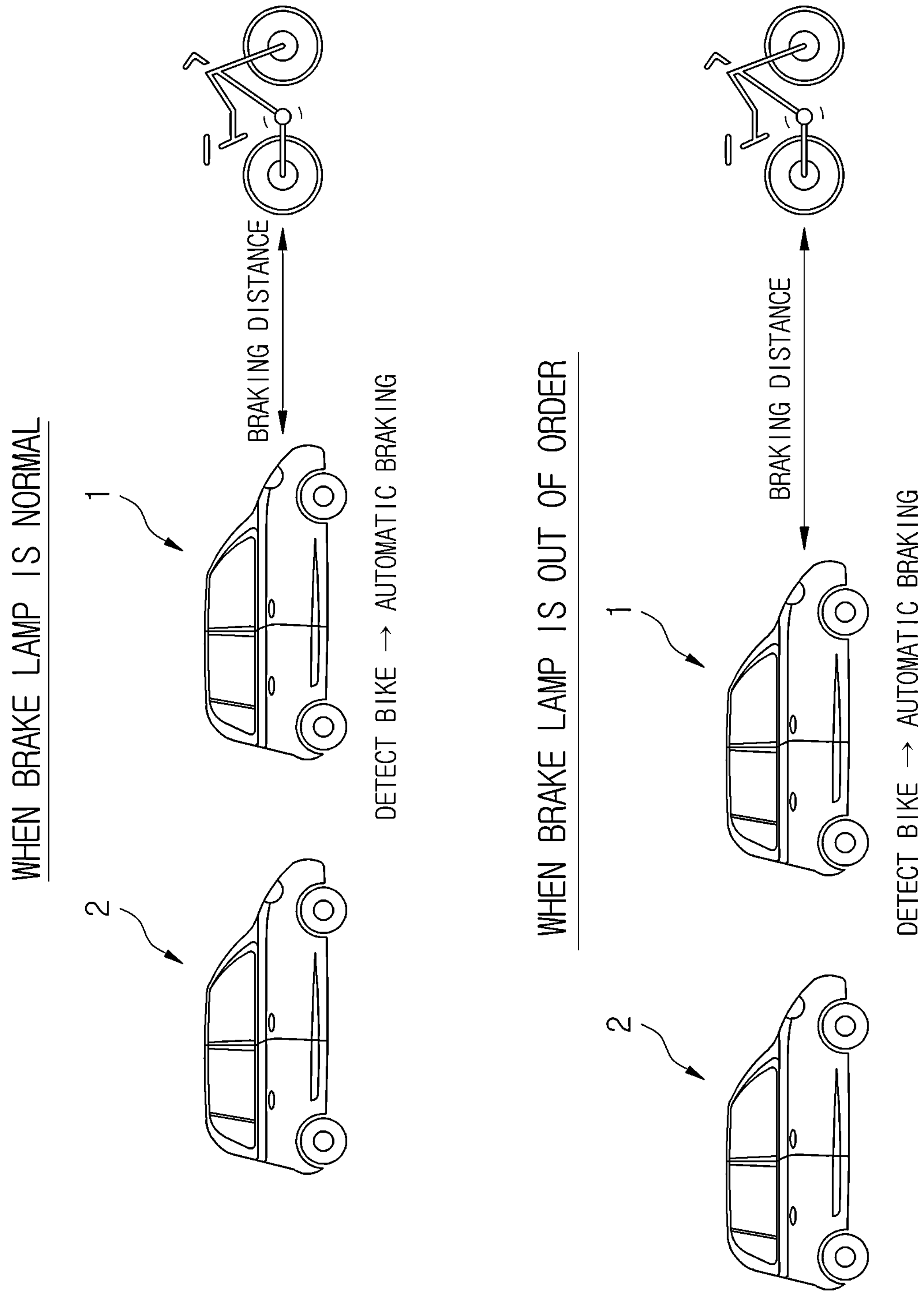
FIG. 10 is a view illustrating performing the driving assistance method according to one embodiment.

FIG. 9 is a flowchart illustrating an operation performed according to a comparison result between a time to collision (TTC) and a reference value in the driving assistance method according to one embodiment, and FIG. 10 is a view illustrating performing the driving assistance method according to one embodiment.

Descriptions of the operation of acquiring the information on the nearby object (1100), the operation of calculating the TTC (1200), and the operation of comparing the TTC with the reference value (1300) are the same as the above-described contents.

Here, the operation of outputting the warning or performing the automatic braking based on the result of comparing the TTC with the reference value (1400) will be described in detail.

As described above, when the brake lamp is normal (YES in 1310), the controller 110 may compare the TTC with the first reference value (1320), and when the TTC is smaller than the first reference value (YES in 1410), the controller 110 may output the warning to the user (1430).

As described above, the warning may be visually output through the display device 50, may also be audibly output through the audio device 60, and may also be output by a haptic method through the steering wheel or the seat belt.

When a driver's braking is not performed even though the warning is output (NO in 1440), the controller 110 may perform the automatic braking using the braking device 30 (1450).

When the brake lamp is out of order (NO in 1310), the controller 110 may compare the TTC with the second reference value greater than the first reference value (1330), and when the TTC is smaller than the second reference value (YES in 1420), the controller 110 may output the warning to the user (1430).

When the driver's braking is not performed even though the warning is output (NO in 1440), the controller 110 may perform the automatic braking using the braking device 30 (1450).

Meanwhile, in order to perform the automatic braking, the controller 110 may transmit a control signal for braking to the braking device 30, and the transmitted control signal may include information on a required deceleration.

In the embodiment, the required deceleration may be differently applied according to the state of the brake lamp 71. For example, the controller 110 may determine that the required deceleration for automatic braking is a first deceleration when the state of the brake lamp 71 is normal and determine that the required deceleration for automatic braking is a second deceleration having a smaller magnitude than the first deceleration when the state of the brake lamp 71 is out of order.

It has been described above that the reference values compared with the TTC are also applied differently according to the state of the brake lamp 71 so that braking is started earlier when the brake lamp 71 is out of order.

In addition, when the deceleration is controlled to be smaller when the brake lamp 71 is out of order, as illustrated in FIG. 10, braking control may be performed for a longer braking distance than when the brake lamp 71 is normal.

Therefore, the driver of the following vehicle 2 can secure the additional reaction time with respect to the braking of the preceding vehicle, thereby improving the stability and reliability of the AEB control.

Figure 11:
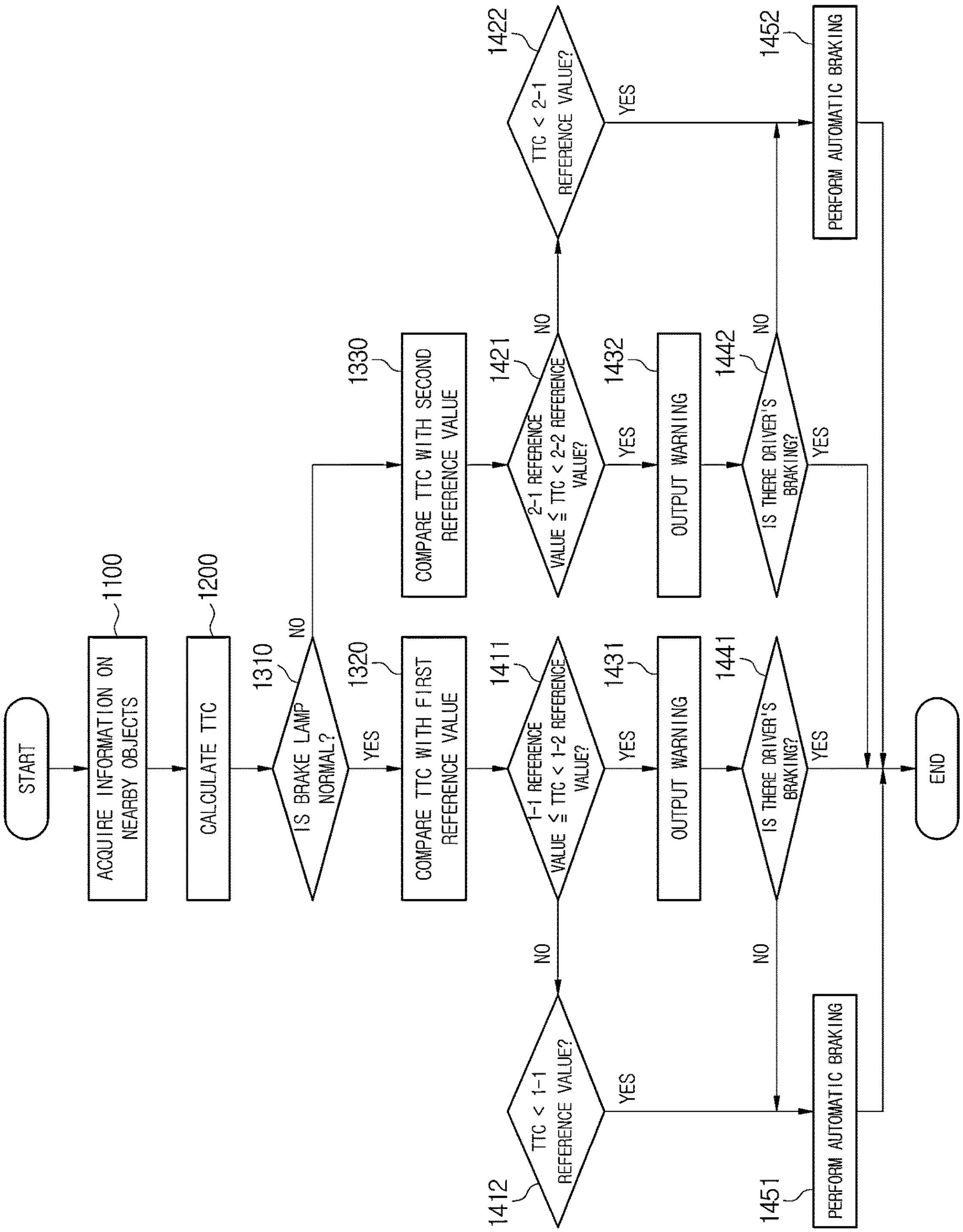
FIG. 11 is a flowchart illustrating an example in which automatic braking is possible immediately according to the comparison result between the TTC and the reference value in the driving assistance method according to one embodiment.
Figure 12:
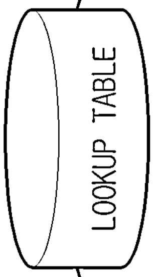
FIG. 12 is a view illustrating a lookup table usable in the example of FIG. 11.

FIG. 11 is a flowchart illustrating an example in which automatic braking is possible immediately according to the comparison result between the TTC and the reference value in the driving assistance method according to one embodiment, and FIG. 12 is a view illustrating a lookup table usable in the example of FIG. 11.

Descriptions of the operation of acquiring the information on the nearby object (1100), the operation of calculating the TTC (1200), and the operation of comparing the TTC with the reference values (1300) are the same as the above-described contents.

In the example, the first reference value used when the brake lamp is normal includes a 1-1 reference value and a 1-2 reference value, and the second reference value used when the brake lamp is out of order includes a 2-1 reference value and a 2-2 reference value.

Referring to FIG. 12, values such as d1 and d2 stored in the first table may be included in the 1-1 reference value, and values such as c1 and c2 stored in the first table may be included in the 1-2 reference value.

Values such as d'1 and d'2 stored in the second table may be included in the 2-1 reference value, and values c'1 and c'2 stored in the second table may be included in the 2-2 reference value.

When the brake lamp is normal and the TTC is greater than or equal to the 1-1 reference value and smaller than the 1-2 reference value (YES in 1411), the controller 110 may output the warning to the user (1431), and when the TTC is smaller than the 1-1 reference value (YES in 1412), the controller 110 may immediately perform the automatic braking (1451). It goes without saying that the warning may be output together with performing the automatic braking.

When the brake lamp is out of order and the TTC is greater than or equal to the 2-1 reference value and smaller than the 2-2 reference value (YES in 1421), the controller 110 may output the warning to the user (1432), and when the TTC is smaller than the 2-1 reference value (YES in 1422), the controller 110 may immediately perform the automatic braking (1452). Even here, it goes without saying that the warning may be output together with performing the automatic braking.

The 2-1 reference value used when the brake lamp is out of order is greater than the 1-1 reference value used when the brake lamp is normal, and the 2-2 reference value used when the brake lamp is out of order is greater than the 1-2 reference value used when the brake lamp is normal.

As is apparent from the above description, according to the driving assistance system, vehicle including the same, and driving assistance method describe above, by setting reference values compared with a TTC to be greater in order to determine whether a warning is output or automatic braking is performed when a brake lamp is out of order, it is possible to allow a driver of a following vehicle to cope with braking of the vehicle in advance, thereby improving the stability and reliability of an AEB function.

In addition, by setting a magnitude of a required deceleration used for automatic braking to be smaller and controlling a braking distance to be longer, it is possible to reduce the possibility of the occurrence of sudden braking of the following vehicle.

According to one aspect of the present disclosure, by differently applying reference values used for determining the warning output or the automatic braking according to the state of the brake lamp of the, it is possible to provide the additional preparation time to the driver of the following vehicle when the brake lamp is out of order, thereby improving the stability and reliability of the AEB function.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A driving assistance system comprising:

a sensor including at least one of a camera, a radar, or a light detection and ranging (LiDAR), which has a field of sensing outside a vehicle;

a processor configured to process output data of the sensor, wherein the processor is configured to:

acquire information on nearby objects of the vehicle based on the output data of the calculate a time to collision (TTC) based on the information on the nearby objects;

compare the TTC with a first reference value when a state of a brake lamp of the vehicle is normal;

compare the TTC with a second reference value greater than the first reference value when the state of the brake lamp is abnormal; and perform automatic braking based on a result of the comparing.

2. The driving assistance system of claim 1, wherein the processor is configured to:

determine that a required deceleration for the automatic braking is a first deceleration when the state of the brake lamp is normal; and determine that the required deceleration for the automatic braking is a second deceleration smaller than the first deceleration when the state of the brake lamp is abnormal.

3. The driving assistance system of claim 2, wherein a braking distance of the vehicle when the state of the brake lamp is abnormal is longer than a braking distance of the vehicle when the state of the brake lamp is normal.

4. The driving assistance system of claim 2, wherein the processor is configured to:

transmit a control signal to a braking device to brake the vehicle according to the first deceleration when the state of the brake lamp is normal; and transmit the control signal to the braking device to brake the vehicle according to the second deceleration when the state of the brake lamp is abnormal.

5. The driving assistance system of claim 1, wherein the processor comprises a memory configured to store a first table and a second table, the first table includes first reference values according to a velocity of the vehicle or a relative velocity between the vehicle and the nearby object and the second table includes second reference values according to the velocity of the vehicle or the relative velocity.

6. A vehicle comprising:

a braking device configured to brake the vehicle;

a brake lamp configured to turn on upon braking of the vehicle and provided at a rear of the vehicle;

a sensor including at least one of a camera, a radar, or a light detection and ranging (LiDAR), which has a field of sensing outside the vehicle; and a processor configured to process output data of the sensor, wherein the processor is configured to:

acquire information on nearby objects of the vehicle based on the output data of the sensor;

calculate a time to collision (TTC) based on the information on the nearby objects;

compare the TTC with a first reference value when a state of the brake lamp is normal;

compare the TTC with a second reference value greater than the first reference value when the state of the brake lamp is abnormal; and perform automatic braking based on a result of the comparing.

7. The vehicle of claim 6, wherein the processor is configured to:

determine that a required deceleration for the automatic braking is a first deceleration when the state of the brake lamp is normal; and determine that the required deceleration for the automatic braking is a second deceleration being a smaller than the first deceleration when the state of the brake lamp is abnormal.

8. The vehicle of claim 7, wherein a braking distance of the vehicle when the state of the brake lamp is abnormal is longer than a braking distance of the vehicle when the state of the brake lamp is normal.

9. The vehicle of claim 7, wherein the processor is configured to:

transmit a control signal to the braking device to brake the vehicle according to the first deceleration when the state of the brake lamp is normal; and transmit the control signal to the braking device to brake the vehicle according to the second deceleration when the state of the brake lamp is abnormal.

10. The vehicle of claim 6, wherein the processor comprises a memory configured to store a first table and a second table, the first table includes first reference values according to a velocity of the vehicle or a relative velocity between the vehicle and the nearby object and the second table includes second reference values according to the velocity of the vehicle or the relative velocity.

11. A driving assistance method comprising:

acquiring information on nearby objects of a vehicle from a sensor including at least one of a camera, a radar, or a light detection and ranging (LiDAR), which has a field of sensing outside the vehicle;

calculating a time to collision (TTC) based on the information on the nearby objects;

comparing the TTC with a first reference value when a state of a brake lamp of the vehicle is normal;

comparing the TTC with a second reference value greater than the first reference value when the state of the brake lamp is abnormal; and performing automatic braking based on a result of the comparing.

12. The driving assistance method of claim 11, further comprising: determining that a required deceleration for the automatic braking is a first deceleration when the state of the brake lamp is normal; and determining that the required deceleration for the automatic braking is a second deceleration being a smaller than the first deceleration when the state of the brake lamp is abnormal.

13. The driving assistance method of claim 11, further comprising storing a first table and a second table, the first table includes first reference values according to a velocity of the vehicle or a relative velocity between the vehicle and the nearby object and the second table includes second reference values according to the velocity of the vehicle or the relative velocity.

14. The driving assistance method of claim 12, further comprising:

transmitting a control signal to a braking device to brake the vehicle according to the first deceleration when the state of the brake lamp is normal; and transmitting the control signal to the braking device to brake the vehicle according to the second deceleration when the state of the brake lamp is abnormal.

* * * * *